United States Patent
Li

(10) Patent No.: US 11,107,464 B2
(45) Date of Patent: Aug. 31, 2021

(54) FEELING ESTIMATION DEVICE, FEELING ESTIMATION METHOD, AND STORAGE MEDIUM

(71) Applicant: HONDA MOTOR CO., LTD., Tokyo (JP)

(72) Inventor: Yuanchao Li, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 16/693,447

(22) Filed: Nov. 25, 2019

(65) Prior Publication Data

US 2020/0175970 A1 Jun. 4, 2020

(30) Foreign Application Priority Data

Dec. 3, 2018 (JP) .............................. JP2018-226236

(51) Int. Cl.
*G10L 15/20* (2006.01)
*G06K 9/62* (2006.01)
(Continued)

(52) U.S. Cl.
CPC ............. *G10L 15/20* (2013.01); *B60W 40/08* (2013.01); *G06K 9/6288* (2013.01); *G10L 15/26* (2013.01);
(Continued)

(58) Field of Classification Search
CPC .. G10L 15/22; G10L 2015/227; B60W 40/08; B50W 2040/089; G06K 9/6288
See application file for complete search history.

(56) References Cited

U.S. PATENT DOCUMENTS 10,510,342 B2 * 12/2019 Lee .......................... G10L 15/19
2016/0310044 A1 * 10/2016 Maeno .................. A61B 5/7221
(Continued)

FOREIGN PATENT DOCUMENTS

JP 2006071936 A * 3/2006
JP 2009-140283 6/2009
(Continued)

OTHER PUBLICATIONS

M. Lukac, M. Kameyama and Y. Migranova, "Live-feeling communication: Multi-algorithm approach to the estimation of human intentions," 2017 IEEE International Conference on Systems, Man, and Cybernetics (SMC), 2017, pp. 2152-2157, doi: 10.1109/SMC.2017.8122938. (Year: 2017).*

(Continued)

*Primary Examiner* — Bharatkumar S Shah
(74) *Attorney, Agent, or Firm* — Amin, Turocy & Watson, LLP

(57) ABSTRACT

A feeling estimation device includes: a first acquirer configured to acquire sound data of an utterance of a user; a second acquirer configured to acquire text data obtained by converting the sound data acquired by the first acquirer into text; a first estimator configured to merge an index value based on the sound data acquired by the first acquirer and an index value based on the text data acquired by the second acquirer via first fusion and estimate a feeling of the user on the basis of the merged index value; and a second estimator configured to merge an index value indicating a result of the estimation performed by the first estimator and the index value based on the text data acquired by the second acquirer via second fusion and estimate a feeling of the user on the basis of the merged index value.

9 Claims, 12 Drawing Sheets

(51) Int. Cl.
*B60W 40/08* (2012.01)
*G10L 15/26* (2006.01)
*G10L 15/22* (2006.01)

(52) U.S. Cl.
CPC .. *B60W 2040/089* (2013.01); *G10L 2015/227* (2013.01)

(56) References Cited

U.S. PATENT DOCUMENTS

2017/0263245 A1\* 9/2017 Mizumoto .............. G10L 15/26
2018/0294001 A1\* 10/2018 Kayama ................. G10L 25/48

FOREIGN PATENT DOCUMENTS

JP   2017120609 A  \* 7/2017
JP    6465077 B2  \* 2/2019  ............. G06F 40/30

OTHER PUBLICATIONS

M. E. Campbell and N. R. Ahmed, "Distributed Data Fusion: Neighbors, Rumors, and the Art of Collective Knowledge," in IEEE Control Systems Magazine, vol. 36, No. 4, pp. 83-109, Aug. 2016, doi: 10.1109/MCS.2016.2558444. (Year: 2016).\*

\* cited by examiner

FEELING ESTIMATION DEVICE, FEELING ESTIMATION METHOD, AND STORAGE MEDIUM

CROSS-REFERENCE TO RELATED APPLICATION

This application is based upon and claims the benefit of priority from Japanese Patent Application No. 2018-226236, filed Dec. 3, 2018, the entire content of which is incorporated herein by reference.

BACKGROUND

Field of the Invention

The present invention relates to a feeling estimation device, a feeling estimation method, and a storage medium.

Description of Related Art

Technologies for estimating feelings of an occupant of a moving object, such as a vehicle, using sound data of an utterance of the occupant and text data representing details of the utterance have been studied. Meanwhile, technologies for merging results output from various identifiers using early fusion and late fusion when clothing of a person is identified from an image or a contour of a person is identified using a plurality of identifiers are known (for example, see Japanese Unexamined Patent Laid-Open No. 2009-140283).

SUMMARY

However, sound recognition precision may deteriorate due to noise around a user or other users' voices according to the related art. As a result, precision of estimating feelings of the user may deteriorate.

Aspects of the invention are to provide a feeling estimation device, a feeling estimation method, and a storage medium capable of improving precision of estimating feelings of a user.

The feeling estimation device, the feeling estimation method, and the storage medium according to the invention employ the following configurations:

(1) According to an aspect of the invention, there is provided a feeling estimation device including: a first acquirer configured to acquire sound data of an utterance of a user; a second acquirer configured to acquire text data obtained by converting the sound data acquired by the first acquirer into text; a first estimator configured to merge an index value based on the sound data acquired by the first acquirer and an index value based on the text data acquired by the second acquirer via first fusion and estimate a feeling of the user on the basis of the merged index value; and a second estimator configured to merge an index value indicating a result of the estimation performed by the first estimator and the index value based on the text data acquired by the second acquirer via second fusion and estimate a feeling of the user on the basis of the merged index value.

According to an aspect (2), the feeling estimation device according to the aforementioned aspect (1) further includes: an outputter configured to output information; and an output controller configured to cause the outputter to output information based on the feeling of the user estimated by the second estimator.

According to an aspect (3), the second estimator estimates whether the feeling of the user is a first positive feeling, a second negative feeling, or a third neutral feeling that is neither the first feeling nor the second feeling on the basis of a result of the second fusion, in the feeling estimation device according to the aforementioned aspect (1) or (2).

According to an aspect (4), the second estimator estimates that the feeling of the user is the first feeling in a case in which a sum of the index value indicating the result of the estimation performed by the first estimator and the index value based on the text data acquired by the second acquirer is equal to or greater than a first threshold value, estimates that the feeling of the user is the second feeling in a case in which the sum of the index value indicating the result of the estimation performed by the first estimator and the index value based on the text data acquired by the second acquirer is equal to or less than a second threshold value that is smaller than the first threshold value, and estimates that the feeling of the user is the third feeling in a case in which the sum of the index value indicating the result of the estimation performed by the first estimator and the index value based on the text data acquired by the second acquirer is less than the first threshold value and greater than the second threshold value, in the feeling estimation device according to the aforementioned aspect (3).

According to an aspect (5), the feeling estimation device according to any one of the aforementioned aspects (1) to (4) further includes: an extractor configured to extract one or more feature amounts from the sound data acquired by the first acquirer, the second acquirer derives a first index value that expresses, as a numerical value, an overall feeling of the text indicated by the text data and a second index value that indicates an amount of feeling content included in the text, and the first estimator merges the first index value and the second index value derived by the second acquirer and the one or more feature amounts extracted by the extractor via the first fusion.

According to an aspect (6), the first estimator adds the first index value and the second index value derived by the second acquirer as elements to multidimensional data that includes each of the one or more feature amounts extracted by the extractor in the first fusion, in the feeling estimation device according to the aforementioned aspect (5).

According to an aspect (7), the first acquirer further acquires driving operation data indicating a driving operation of a vehicle that the user is in and captured image data of the user, and the first estimator merges the index value based on the sound data acquired by the first acquirer, the index value based on the text data acquired by the second acquirer, an index value based on the driving operation data acquired by the first acquirer, and an index value based on the image data acquired by the first acquirer via the first fusion and estimating a feeling of the user on the basis of the merged index value, in the feeling estimation device according to any one of the aforementioned aspects (1) to (6).

(8) According to another aspect of the invention, there is provided a feeling estimation method including, by a computer: acquiring sound data of an utterance of a user; acquiring text data that is obtained by converting the acquired sound data into text; merging an index value based on the sound data and an index value based on the text data via first fusion and estimating a feeling of the user on the basis of the merged index value; and merging an index value indicating a result of the estimation of the feeling of the user based on the index value merged via the first fusion and the index value based on the text data via second fusion and estimating a feeling of the user on the basis of the merged index value.

(9) According to yet another aspect of the invention, there is provided a computer-readable non-transitory storage medium that stores a program for causing a computer to execute: acquiring sound data of an utterance of a user; acquiring text data that is obtained by converting the acquired sound data into text; merging an index value based on the sound data and an index value based on the text data via first fusion and estimating a feeling of the user on the basis of the merged index value; and merging an index value indicating a result of the estimation of the feeling of the user based on the index value merged via the first fusion and the index value based on the text data via second fusion and estimating a feeling of the user on the basis of the merged index value.

According to the aspects (1) to (9), it is possible to improve precision of estimating feelings of a user.

DESCRIPTION OF EMBODIMENTS

Hereinafter, embodiments of a feeling estimation device, a feeling estimation method, and a storage medium according to the embodiment will be described with reference to drawings.

First Embodiment

System Configuration

Figure 1:
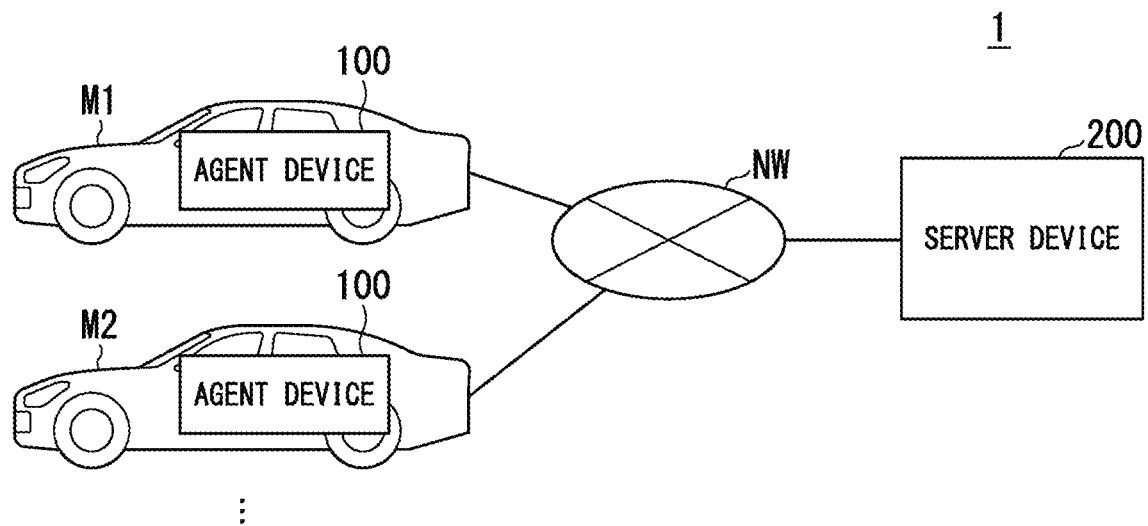
FIG. 1 is a diagram illustrating an example of a configuration of an agent system according to a first embodiment.

FIG. 1 is a diagram illustrating an example of a configuration of an agent system 1 according to a first embodiment. The agent system 1 according to the first embodiment includes, for example, a plurality of agent devices 100 and a server device 200. As in the example illustrated in the drawing, each agent device 100 is mounted in a vehicle M. The vehicle M is, for example, a vehicle with two wheels, three wheels, four wheels, or the like. A drive source for such a vehicle may be an internal combustion engine such as a diesel engine or a gasoline engine, a motor, or a combination thereof. The motor operates using power generated by a generator coupled to the internal combustion engine or power discharged from a secondary battery or a fuel battery.

The agent devices 100 and the server device 200 are communicably connected to each other via a network NW. The network NW includes a local area network (LAN) or a wide area network (WAN). The network NW may include a network using wireless communication, such as Wi-Fi or Bluetooth (registered trademark, not repeated below), for example.

The agent devices 100 are devices with a function of performing sound conversation with an occupant of the vehicle M and assisting conversation between occupants (hereinafter referred to as an agent function). The agent function is realized by a software agent (intelligent agent) with a specific type of artificial intelligence function.

The server device 200 communicates with the agent device 100 mounted in each vehicle M and collects various kinds of data from the agent device 100. The server device 200 estimates a feeling of the occupant of each vehicle M by analyzing the collected data and transmits the estimation result to the agent device 100. The server device 200 is an example of the "feeling estimation device".

A moving object in which the agent device 100 is mounted is not limited to the vehicle M and may be another moving object such as an airplane, an airship, an aircraft such as a helicopter, a ship such as a passenger ship, for example.

Sequence of Agent System

Figure 2:
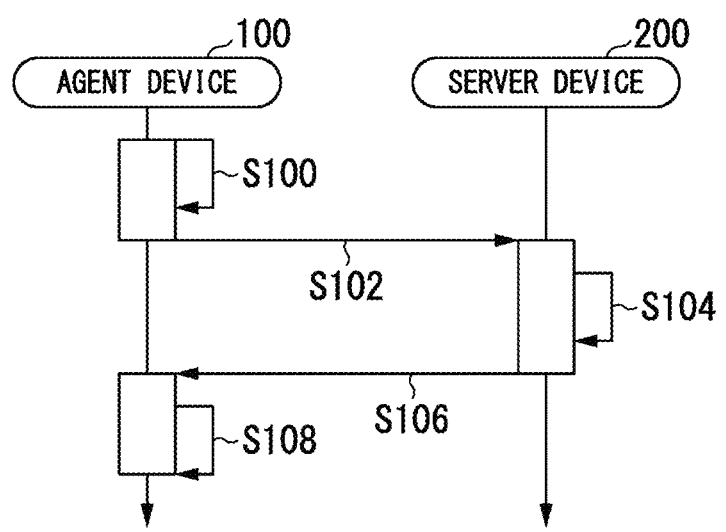
FIG. 2 is a sequence diagram illustrating a flow of a series of processing performed by the agent system according to the first embodiment.

FIG. 2 is a sequence diagram illustrating a flow of a series of processing of the agent system 1 according to the first embodiment. First, in a case in which sound of an utterance of an occupant is collected by a microphone 104, an agent device 100 acquires data of the collected sound (hereinafter referred to as sound data) from the microphone 104 (Step S100).

Next, the agent device 100 transmits the acquired sound data to the server device 200 (Step S102).

The server device 200 receives the sound data from the agent device 100 and then estimates a feeling of an occupant of the vehicle M in which the agent device 100 is mounted, on the basis of the received sound data (Step S104).

Next, the server device 200 transmits the result of estimating the feeling of the occupant to the agent device 100 (Step S106).

Next, the agent device 100 receives the estimation result from the server device 200 and then determines a conversation assist form on the basis of the estimation result (Step S108). For example, the agent device 100 changes a sound pressure level, a cadence, and the like of conversation sound, changes music selection to be replayed in the vehicle, or changes a video or an image to be displayed in the vehicle, in accordance with the result of estimating the feeling of the occupant.

Configuration of Agent Device

Figure 3:
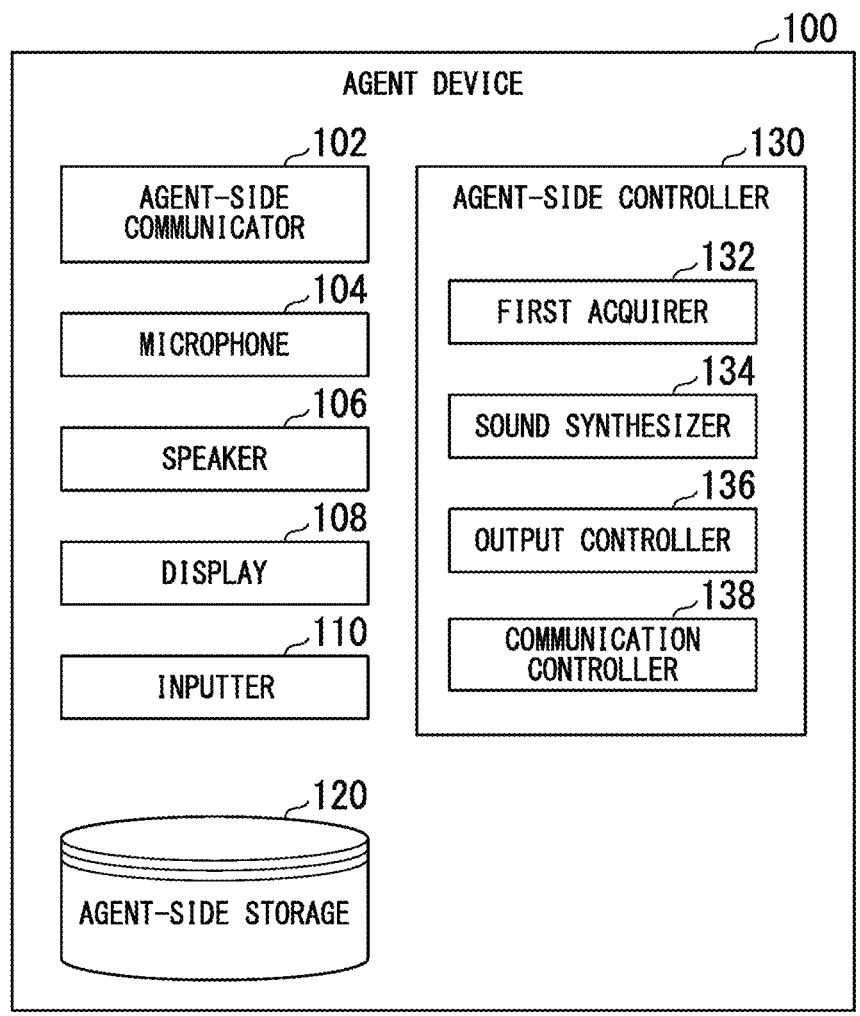
FIG. 3 is a diagram illustrating an example of a configuration of an agent device according to the first embodiment.

FIG. 3 is a diagram illustrating an example of a configuration of the agent device 100 according to the first embodiment. The agent device 100 according to the first embodiment includes, for example, an agent-side communicator 102, a microphone 104, a speaker 106, a display 108, an inputter 110, an agent-side storage 120, and an agent-side controller 130.

These devices and machines may be connected to each other through a multiplexed communication line such as a controller area network (CAN) communication line, a serial communication line, a wireless communication network, and the like. The configuration of the agent device 100 illustrated in FIG. 3 is just an example, a part of the configuration may be omitted, or another configuration may be further added thereto.

The agent-side communicator 102 includes a communication interface such as a network interface card (NIC). The agent-side communicator 102 communicates with the server device 200 and the like via the network NW.

The microphone 104 is a sound input device that collects sound in the vehicle. The microphone 104 outputs the collected sound data to the agent-side controller 130. For example, the microphone 104 is mounted near a front side of the occupant seated in a seat in the vehicle. For example, the microphone 104 may be mounted near a mat lamp, a steering wheel, an instrument panel, or a seat. A plurality of microphones 104 may be mounted in the vehicle.

The speaker 106 is mounted near the seat or the display 108 in the vehicle. The speaker 106 outputs sound on the basis of information output from the agent-side controller 130.

The display 108 includes a display device such as a liquid crystal display (LCD) or an organic electroluminescence (EL) display. The display 108 displays an image on the basis of information output from the agent-side controller 130.

The inputter 110 is, for example, a user interface such as a button, a keyboard, a mouse, and the like. The inputter 110 receives an operation from an occupant and outputs a signal in accordance with the received operation to the agent-side controller 130. The inputter 110 and the display 108 may be an integrated touch panel.

Figure 4:
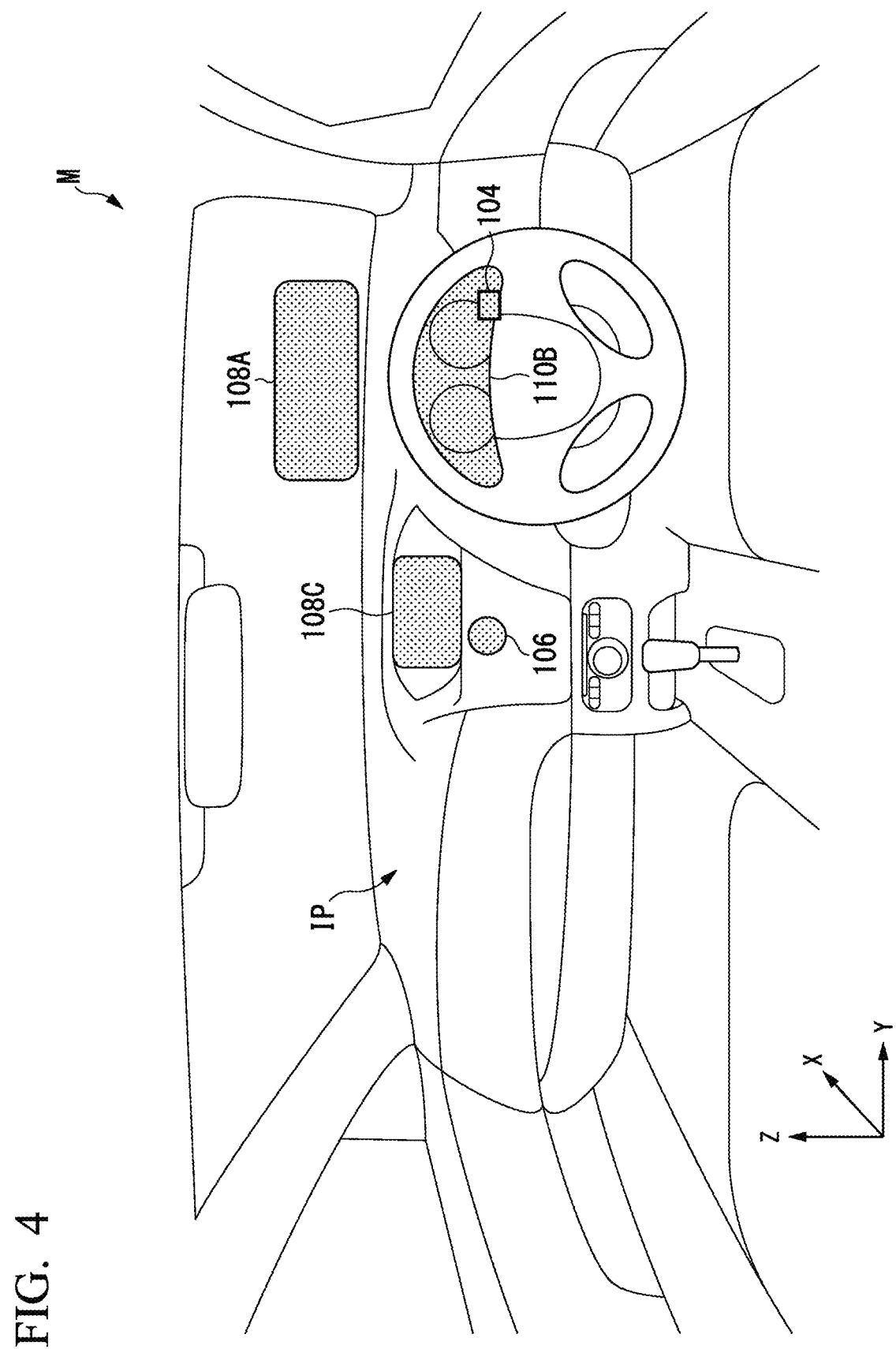
FIG. 4 is a diagram illustrating an example of a vehicle interior when seen from a driver's seat.
Figure 5:
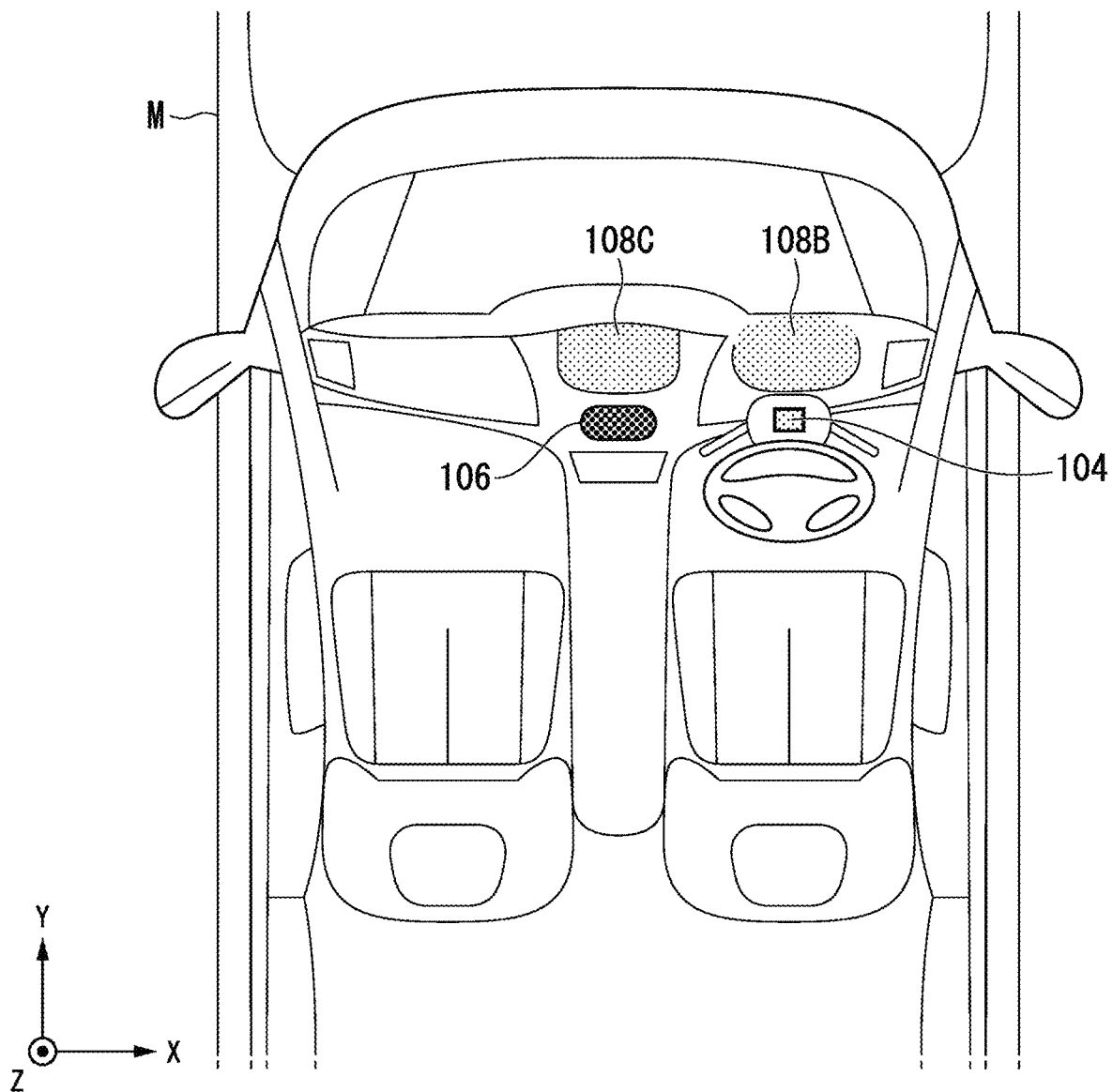
FIG. 5 is a diagram illustrating an example of a vehicle interior when seen from the above.

FIG. 4 is a diagram illustrating an example of an interior of the vehicle M when seen from a driver's seat. FIG. 5 is a diagram illustrating an example of the interior of the vehicle M when seen from the above. In the interior of the vehicle in the example illustrated in the drawings, the microphone 104, the speaker 106, and displays 108A to 108C are mounted. The microphone 104 is provided, for example, at a steering wheel and mainly collects sound of an utterance of a driver. The speaker 106 is mounted near the display 108C, that is, near the center of an instrument panel IP, for example.

The display 108A is a head-up display (HUD) device that causes a virtual image to be displayed in front of a line of sight when the driver views out of the vehicle, for example. The HUD device is a device of allowing the occupant to visually recognize a virtual image by projecting light on a front window shield of the vehicle M or a transparent member with light permeability called a combiner, for example. Although the occupant is mainly a driver, the occupant may be an occupant other than the driver.

The display 108B is provided on the instrument panel IP near the front of the driver's seat (the seat closest to the steering wheel) and is mounted at a position at which the display 108B can be visually recognized by the occupant through a gap of the steering wheel or through the steering wheel. The display 108B is, for example, an LCD, an organic EL display device, or the like. On the display 108B, for example, images of a speed of the vehicle M, an engine rotation frequency, a fuel remaining amount, a radiator water temperature, a traveling distance, and other information are displayed.

The display 108C is mounted near the center of the instrument panel IP. The display 108C is, for example, an LCD, an organic EL display device, or the like similarly to the display 108B. The display 108C displays content such as a television program, a movie, or the like.

Returning to description of FIG. 3, the agent-side storage 120 is realized by an HDD, a flash memory, an electrically erasable programmable read only memory (EEPROM), a read only memory (ROM), a random access memory (RAM), or the like. The agent-side storage 120 stores a program referred to by a processor, for example.

The agent-side controller 130 includes, for example, a first acquirer 132, a sound synthesizer 134, an output controller 136, and a communication controller 138.

These components are realized by a processor such as a central processing unit (CPU) or a graphics processing unit (GPU) executing a program (software), for example. Some or all of these components may be realized by hardware (a circuit; including a circuitry) such as a large scale integration (LSI), an application specific integrated circuit (ASIC), or a field-programmable gate array (FPGA) or may be realized through cooperation of software and hardware. The program may be stored in advance in the agent-side storage 120 or may be stored in a detachable storage medium such as a DVD or a CD-ROM and may be installed in the agent-side storage 120 by the storage medium being attached to a drive device.

The first acquirer 132 acquires sound data from the microphone 104.

The sound synthesizer 134 generates artificial synthetic sound (hereinafter referred to as agent sound) on the basis of data received by the agent-side communicator 102 from the server device 200.

If agent sound is generated by the sound synthesizer 134 or the agent sound is acquired from an external device, then the output controller 136 causes the speaker 106 to output the agent sound. The output controller 136 may cause the display 108 to display a phrase (text data) that is a source of the agent sound as an image.

The communication controller 138 transmits the sound data acquired by the first acquirer 132 to the server device 200 via the agent-side communicator 102.

Processing Flow Performed by Agent Device

Figure 6:
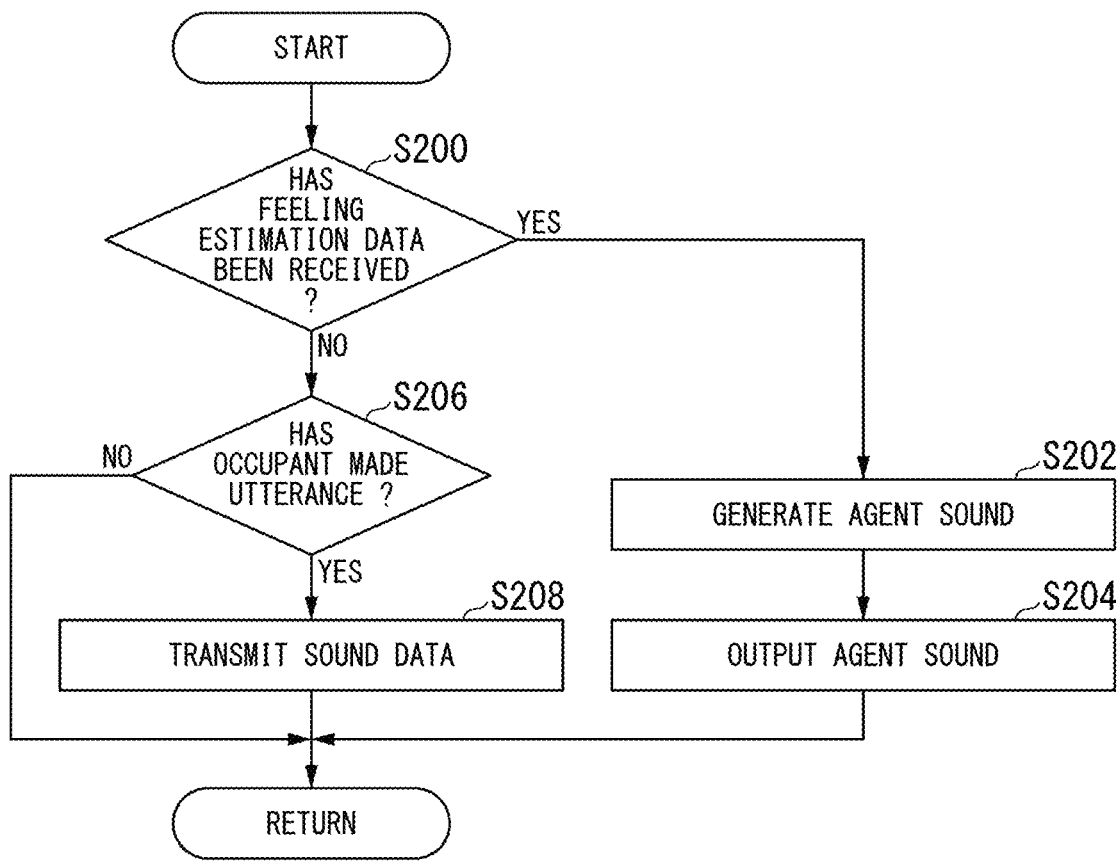
FIG. 6 is a flowchart illustrating a flow of a series of processing performed by the agent device according to the first embodiment.

Hereinafter, a flow of a series of processing performed by the agent device 100 according to the first embodiment will be described with reference to a flowchart. FIG. 6 is a flowchart illustrating a flow of a series of processing performed by the agent device 100 according to the first embodiment. The processing in the flowchart may be repeated at a predetermined cycle.

First, the first acquirer 132 determines whether or not the agent-side communicator 102 has received feeling estimation data including the result of estimating the feeling of the occupant and the text data indicating details of the utterance of the sound of the occupant that has been used for the estimation of the feeling (Step S200), and in a case in which it is determined that the agent-side communicator 102 has received the feeling estimation data, the first acquirer 132 acquires the feeling estimation data from the agent-side communicator 102.

If the first acquirer 132 acquires the feeling estimation data, then the sound synthesizer 134 generates agent sound on the basis of the text data and the result of estimating the feeling included in the feeling estimation data (Step S202).

For example, the sound synthesizer 134 performs waveform connection-type sound synthesis (concatenative synthesis) and formant synthesis and generates an agent sound that reads pronunciation symbols included in the text data. In a case in which no pronunciation symbols are included and character sequences representing phrases are included in the text data, the sound synthesizer 134 may convert the character sequences into pronunciation symbols and generate an agent sound reading the converted pronunciation symbols. When the agent sound is generated, the sound synthesizer 134 changes a pitch, a cadence, a sound pressure level, a reading speed, and the like of the agent sound in accordance with the result of estimating the feeling. In a case in which the feeling of the occupant has been estimated as being a negative feeling such as "anger," for example, the sound synthesizer 134 may reduce the sound pressure level or delay the reading speed of the agent sound in order to calm the occupant down.

Next, the output controller 136 causes the speaker 106 to output the agent sound generated by the sound synthesizer 134 (Step S204). At this time, the output controller 136 may cause the display 108 to display an image or a movie in accordance with the result of estimating the feeling or may select music in accordance with the result of estimating the feeling as music to be replayed in the vehicle.

Figure 7:
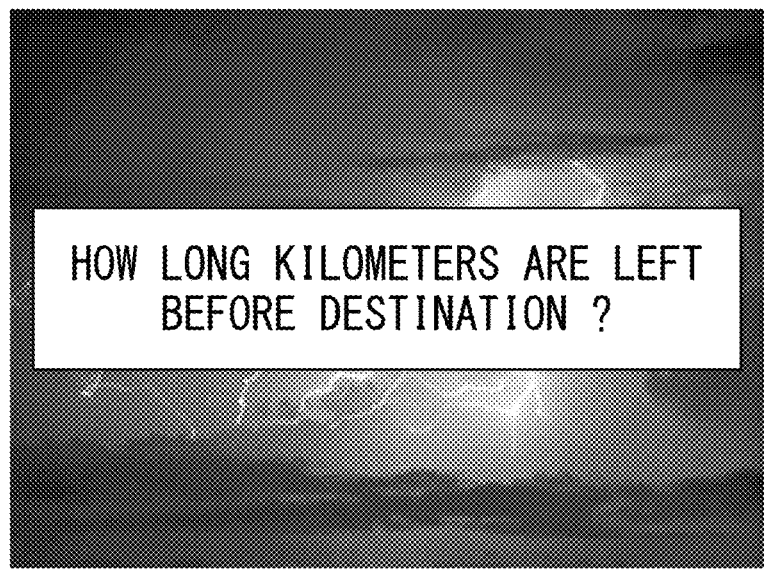
FIG. 7 is a diagram illustrating an example of an image displayed on a display.
Figure 8:
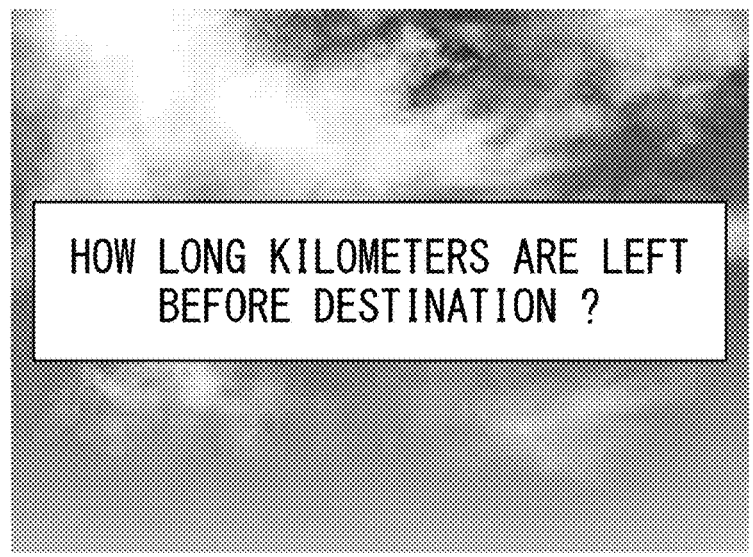
FIG. 8 is a diagram illustrating an example of an image displayed on the display.

FIGS. 7 and 8 are diagrams illustrating examples of images displayed on the display 108. For example, the output controller 136 may display details of an utterance of the occupant (the character sequence "How many kilometers are left before the destination?" in the example illustrated in the drawing) in a superimposed manner with a background image in accordance with the result of estimating the feeling of the occupant. In a case in which the feeling of the occupant is estimated as being a negative feeling such as "anger," the output controller 136 causes details of the utterance of the occupant to be displayed in a superimposed manner on a background image representing that the weather is bad weather, as illustrated as an example in FIG. 7. Meanwhile, in a case in which the feeling of the occupant is estimated as being a positive feeling such as "pleasure," the output controller 136 causes details of the utterance of the occupant to be displayed in a superimposed manner on a background image representing that the weather is clear weather, as illustrated as an example in FIG. 8. The output controller 136 may change a color, a size, a font, and the like of character sequences representing the details of the utterance of the occupant in accordance with the result of estimating the feeling of the occupant.

Meanwhile, in a case in which it is determined that the agent-side communicator 102 has not received the feeling estimation data in the processing in S200, the first acquirer 132 determines whether or not the microphone 104 has collected sound of the utterance of the occupant, that is, whether or not the occupant has made an utterance (Step S206).

In a case in which it is determined that the occupant has made an utterance, the communication controller 138 transmits the sound data collected by the microphone 104 to the server device 200 via the agent-side communicator 102 (Step S208). In this manner, the processing of the flowchart ends.

Configuration of Server Device

Figure 9:
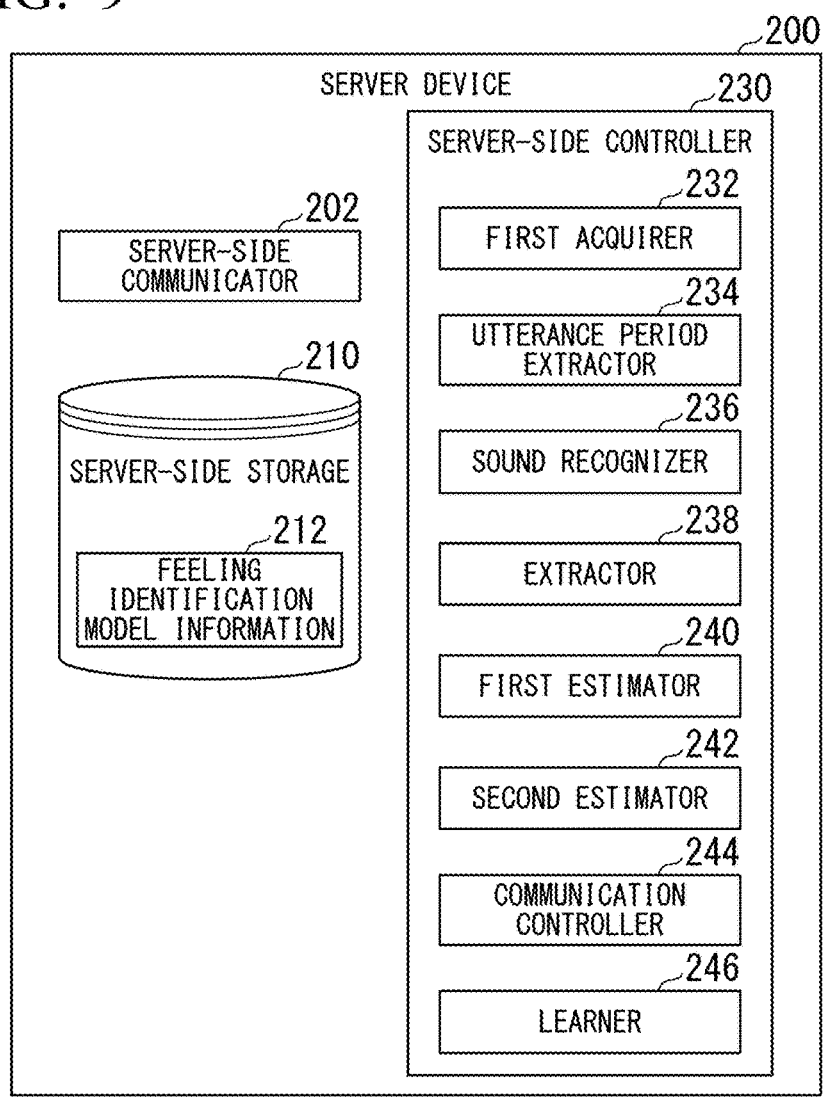
FIG. 9 is a diagram illustrating an example of a configuration of a server device according to the first embodiment.

FIG. 9 is a diagram illustrating an example of a configuration of the server device 200 according to the first embodiment. The server device 200 according to the first embodiment includes, for example, a server-side communicator 202, a server-side storage 210, and a server-side controller 230.

The server-side communicator 202 includes a communication interface such as an NIC. The server-side communicator 202 communicates with the agent device 100 and the like mounted in each vehicle M via the network NW. The server-side communicator 202 is an example of the "outputter."

The server-side storage 210 is realized by an HDD, a flash memory, an EEPROM, a ROM, or a RAM, or the like. The server-side storage 210 stores feeling identification model information 212 and the like in addition to a program referred to by a processor, for example.

The feeling identification model information 212 is information (a program or a data structure) that defines a feeling identification model MDL for identifying a feeling of the user. The feeling identification model MDL is a model that is learned to identify a feeling at the time of an utterance of the user if data including at least feature amounts of the user's voice is input.

The feeling identification model MDL may be realized using a deep neural network (DNN), for example. The feeling identification model MDL is not limited to a DNN and may be realized by another model such as a logistic regression, a support vector machine (SVM), a k-nearest neighbor algorithm (k-NN), a decision tree, a naive Bayes classifier, or a random forest.

In a case in which the feeling identification model MDL is realized by a DNN, the feeling identification model information 212 includes, for example, coupling information indicating how neurons (referred to as units or nodes) included in each of an input layer, one or more hidden layers (intermediate layers), and an output layer forming each DNN included in the feeling identification model MDL are coupled, weight information indicating how many coupling factors are applied to data input and output between the coupled neurons, and the like. The coupling information includes, for example, information of designating the number of neurons included in each layer and a type of neuron that is a coupling destination of each neuron, an activation function for realizing each neuron, information regarding gates and the like provided between neurons in the hidden layers, and the like. The activation function realizing a neuron may be, for example, a function (a rectified linear unit (ReLU) function, an exponential linear units (ELU) function, or the like) that switches an operation in accordance with an input symbol, a sigmoid function, a step function, a hyperbolic tangent function or may be an identity function. A gate selectively causes data transmitted between neurons to pass or applies a weight to data in accordance with a value (for example, 1 or 0) with which an activation function replies, for example. The coupling factor includes a weight applied to output data when the data is output from a specific neuron to a neuron in a deeper layer in hidden layers in a neural network, for example. The coupling factor may include a bias component and the like unique to each layer.

The server-side controller 230 includes, for example, a first acquirer 232, an utterance period extractor 234, a sound recognizer 236, a feature amount extractor 238, a first estimator 240, a second estimator 242, a communication controller 244, and a learner 246. The sound recognizer 236 is an example of the "second acquirer," and the communication controller 244 is an example of "the output controller configured to cause the outputter to output information based on a feeling of the user."

These components are realized by a processor such as a CPU or a GPU executing a program (software), for example. Some or all of these components may be realized by hardware (a circuit; including circuitry) such as an LSI, an ASIC, or an FPGA or may be realized through software and hardware in cooperation. The program may be stored in advance in the server-side storage 210 or may be stored in a detachable storage medium such as a DVD or a CD-ROM and may be installed in the server-side storage 210 by the storage medium being attached to the drive device (disk drive).

The first acquirer 232 acquires sound data from the agent device 100 via the server-side communicator 202.

The utterance period extractor 234 extracts a period during which the occupant is making an utterance (hereinafter referred to as an utterance period) from the sound data acquired by the first acquirer 132. For example, the utterance period extractor 234 may use a zero crossing method to extract the utterance period on the basis of an amplitude of sound signals included in the sound data. The utterance period extractor 234 may extract the utterance period from the sound data on the basis of a Gaussian mixture model (GMM) or may extract the utterance period from the sound data by performing template matching processing with a database obtained by templating sound signals unique to the utterance period.

The sound recognizer 236 recognizes sound for each utterance period extracted by the utterance period extractor 234 and converts the recognized sound into text, thereby generating text data representing details of the utterance.

For example, the sound recognizer 236 inputs sound signals during the utterance period into a recurrent neural network including, for example, a bi-directional long short-term memory (BiLSTM), an attention mechanism, and the like, thereby obtaining a spectrogram (mel-spectrogram) in which the sound signals are separated into a plurality of frequency bands such as a low frequency band and a high frequency band and sound signals in each frequency band are Fourier-converted. The recurrent neural network may be learned in advance using teacher data in which sound signals for learning are associated as teacher labels with the spectrograms generated from sound for learning, for example.

Then, the sound recognizer 236 inputs the spectrogram into a convolutional neural network including a plurality of hidden layers, thereby obtaining character sequences from the spectrogram. The convolutional neural network may be learned in advance by using teacher data in which character sequences corresponding to sound signals used for generating spectrograms for learning are associated as teacher labels with the spectrograms for learning, for example. The sound recognizer 236 generates the data of the character sequences obtained from the convolutional neural network as text data.

The sound recognizer 236 generates the text data from the sound data, then inputs the generated text data into the DNN learned in advance to analyze a feeling of the occupant, thereby deriving an index that expresses the feeling of the occupant as a numerical value (hereinafter referred to as a sentiment analysis index $IN_S$). The sentiment analysis index $IN_S$ is an example of "the index value based on text data."

The sentiment analysis index $IN_S$ includes a score S indicating an overall feeling of the text as a target of the analysis and a magnitude M indicating a depth (a size or a range of vibration) of the overall feeling of the text, for example. For example, the score S is a value that is closer to +1.0 as the entire text includes more positive words such as "fun" and "happy," is a value that is closer to −1.0 as the entire text includes more negative words such as "sad" or "annoying," and is a numerical value that is closer to 0.0 as the entire text includes more neutral words. The magnitude M represents the number of character sequences (strings) representing opinions regarding feelings in a text within a numerical range from −1.0 to +1.0. In a case in which the score S is close to 0.0, the text is a neutral word or represents that the text includes equivalent numbers of positive words and negative words, whose polarities cancel each other. The character sequences representing opinions regarding feelings in text are an example of "content."

Typically, the fact that a small magnitude M represents a truly neutral text and a large magnitude M represents a text in which positive words and negative words coexist is known. Therefore, even if the score S is a value that is close to 0.0, it is possible to distinguish whether the text that is a target of the analysis is a truly neutral text or a text in which positive words and negative words coexist in accordance with the value of the magnitude M. The score S is an example of the "first index value" while the magnitude M is an example of the "second index value."

The feature amount extractor 238 extracts a feature amount of a voice of the occupant (hereinafter referred to as a sound feature amount F) from sound during each utterance period extracted by the utterance period extractor 234. The sound feature amount F is an example of "the index value based on sound data."

The sound feature amount F includes, for example, a zero-crossing rate (ZCR), a root mean square (RMS), a basic frequency F0 of a voice pitch, a harmonics-to-noise ratio (HNR), and a mel-frequency cepstrum coefficient (MFCC). The sound feature amount F may include statistical values such as a minimum value, a maximum value, a standard deviation, an average value, a kurtosis, skewness, a relative position, a range, a linear regression coefficient, a mean square error, and the like of such various index values. The sound feature amount F may be represented by a multidimensional vector including these various feature amounts as elements. The multidimensional vector representing the sound feature amount F is an example of the "multidimensional data."

The first estimator 240 fuses the sound feature amount F extracted by the feature amount extractor 238 with the sentiment analysis index $IN_S$ derived by the sound recognizer 236 and inputs the fusion result into the feeling identification model MDL, thereby tentatively estimating a feeling of the occupant. Hereinafter, the fusion of the sound feature amount F and the sentiment analysis index $IN_S$ that is data input to the feeling identification model MDL as one result will be referred to as "early fusion" when described below. The early fusion is an example of the "first fusion."

Figure 10:
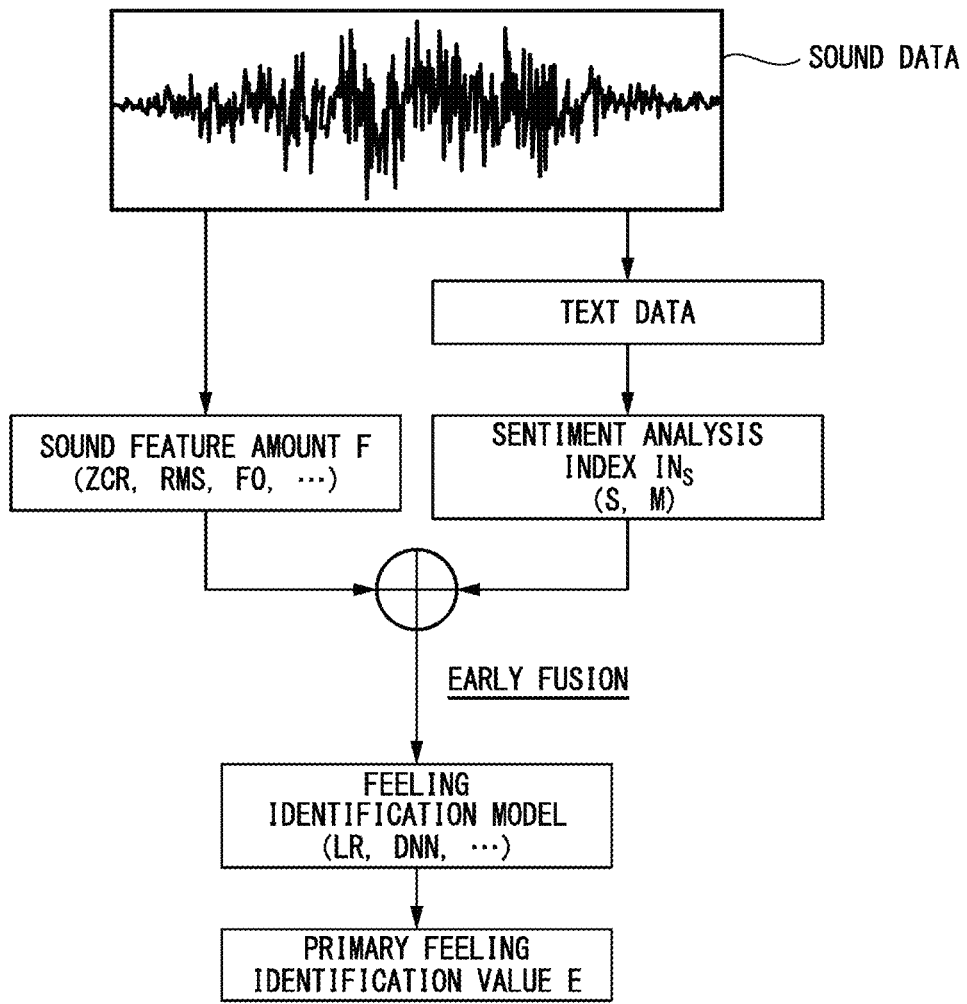
FIG. 10 is a diagram for explaining early fusion according to the first embodiment.

FIG. 10 is a diagram for explaining early fusion according to the first embodiment. For example, the first estimator 240 adds the score S and the magnitude M of the sentiment analysis index $IN_S$ as new elements to a multidimensional vector representing the sound feature amount F such as ZCR, RMS, and F0 as early fusion. In this manner, the number of dimensions of the input data to be input to the feeling identification model MDL is expanded.

Then, the first estimator 240 inputs a multidimensional vector (a multidimensional vector with a larger number of dimensions) including, as elements, the respective feature amounts included in the sound feature amount F, the score S, and the magnitude M to the feeling identification model MDL realized by logistic regression, DNN, or the like.

If the vector is input, for example, the feeling identification model MDL outputs a value obtained by identifying whether the feeling of the user is a positive feeling (an example of the first feeling), a negative feeling (an example of the second feeling), or a neutral feeling (an example of the third feeling). For example, a primary feeling identification value E is a value that is close to +1.0 if the feeling of the user is a positive feeling, the primary feeling identification value E is a value that is close to −1.0 if the feeling of the user is a negative feeling, and the primary feeling identification value E is a value that is close to 0.0 if the feeling of the user is a neutral feeling.

For example, the first estimator 240 tentatively estimates that the feeling corresponding to the primary feeling identification value E output by the feeling identification model MDL is a feeling of the occupant that has uttered the sound as a source from which the sound feature amount F has been extracted.

The second estimator 242 fuses the primary feeling identification value E as an estimation result of the first estimator 240 and the sentiment analysis index $IN_S$ derived by the sound recognizer 236 into one result and estimates a feeling of the occupant on the basis of the fusion result. Hereinafter, the fusion of the primary feeling identification value E with the sentiment analysis index $IN_S$ will be referred to as "late fusion", and this will be described below. The late fusion is an example of the "second fusion".

Figure 11:
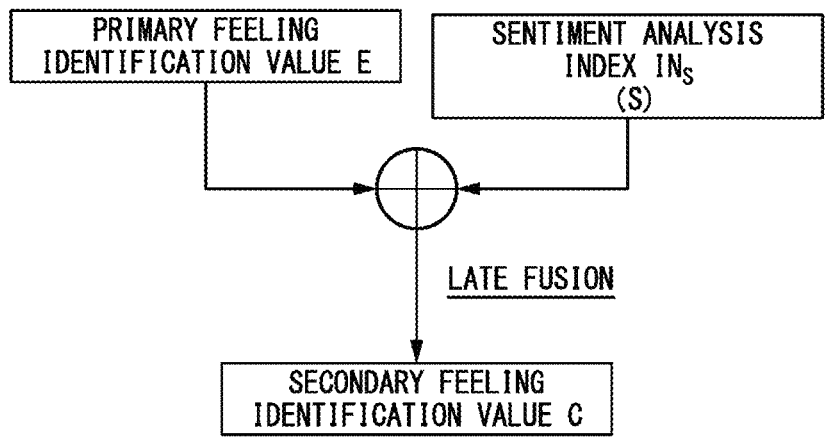
FIG. 11 is a diagram for explaining late fusion according to the first embodiment.

FIG. 11 is a diagram for explaining late fusion according to the first embodiment. For example, the second estimator 242 obtains a total value of the primary feeling identification value E and the sentiment analysis index $IN_S$, and derives, as a result of estimating the feeling of the occupant, a value obtained by identifying whether the feeling of the occupant is a positive feeling, a negative feeling, or a neutral feeling, in accordance with the total value (hereinafter referred to as a secondary feeling identification value C). Specifically, the second estimator 242 derives the secondary feeling identification value C on the basis of Expression (1).

[Expression 1]

$$C = \begin{cases} +1, & \text{if } E+S \geq 1.0 \\ -1, & \text{if } E+S \leq -1.0 \\ 0, & \text{else} \end{cases} \quad (1)$$

For example, the second estimator 242 sets the secondary feeling identification value C to +1.0 representing a positive feeling in a case in which a total value (E+S) obtained by adding (merging) the primary feeling identification value E to the score S included in the sentiment analysis index $IN_S$ is +1.0 or more, sets the secondary feeling identification value C to −1.0 representing a negative feeling in a case in which the total value (E+S) is −1.0 or less, and sets the secondary feeling identification value C to 0.0 representing a neutral feeling in a case in which the total value (E+S) is less than +1.0 and is greater than −1.0, in accordance with Equation (1). +1.0 is an example of the "first threshold value" while −1.0 is an example of the "second threshold value".

The communication controller 244 transmits the feeling estimation data including the secondary feeling identification value C as the estimation result of the second estimator 242 and the text data generated by the sound recognizer 236 to the agent device 100 via the server-side communicator 202. The feeling estimation data is an example of the "information based on the feeling of the user".

The learner 246 learns the feeling identification model MDL on the basis of teacher data prepared in advance. The teacher data is data in which the primary feeling identification value E as a correct answer is associated as a teacher label with the sound feature amount F extracted from specific sound data for learning and the sentiment analysis index $IN_S$ obtained from text data generated from the same sound data for learning. For example, a primary feeling identification value E of −1.0 is associated with the sound feature amount f and the sentiment analysis index $IN_S$ of sound data when a user in anger is allowed to make an utterance.

For example, the learner 246 performs early fusion on the sound feature amount F and the sentiment analysis index $IN_S$ of the teacher data and inputs the fusion result to the feeling identification model MDL. Then, the learner 246 learns the feeling identification model MDL such that the primary feeling identification value E as a result output from the feeling identification model MDL approaches the primary feeling identification value E as a correct answer associated as the teacher label with the sound feature amount F and the sentiment analysis index $IN_S$ input to the feeling identification model MDL.

In a case in which the feeling identification model MDL is a neural network, for example, the learner 246 learns parameters of the feeling identification model MDL using a stochastic gradient method such as stochastic gradient descent (SGD), momentum SGD, AdaGrad, RMSprop, AdaDelta, and adaptive moment estimation (Adam) so as to reduce a difference between the primary feeling identification value E output from the feeling identification model MDL and the primary feeling identification value E of the teacher label.

Processing Flow of Server Device

Figure 12:
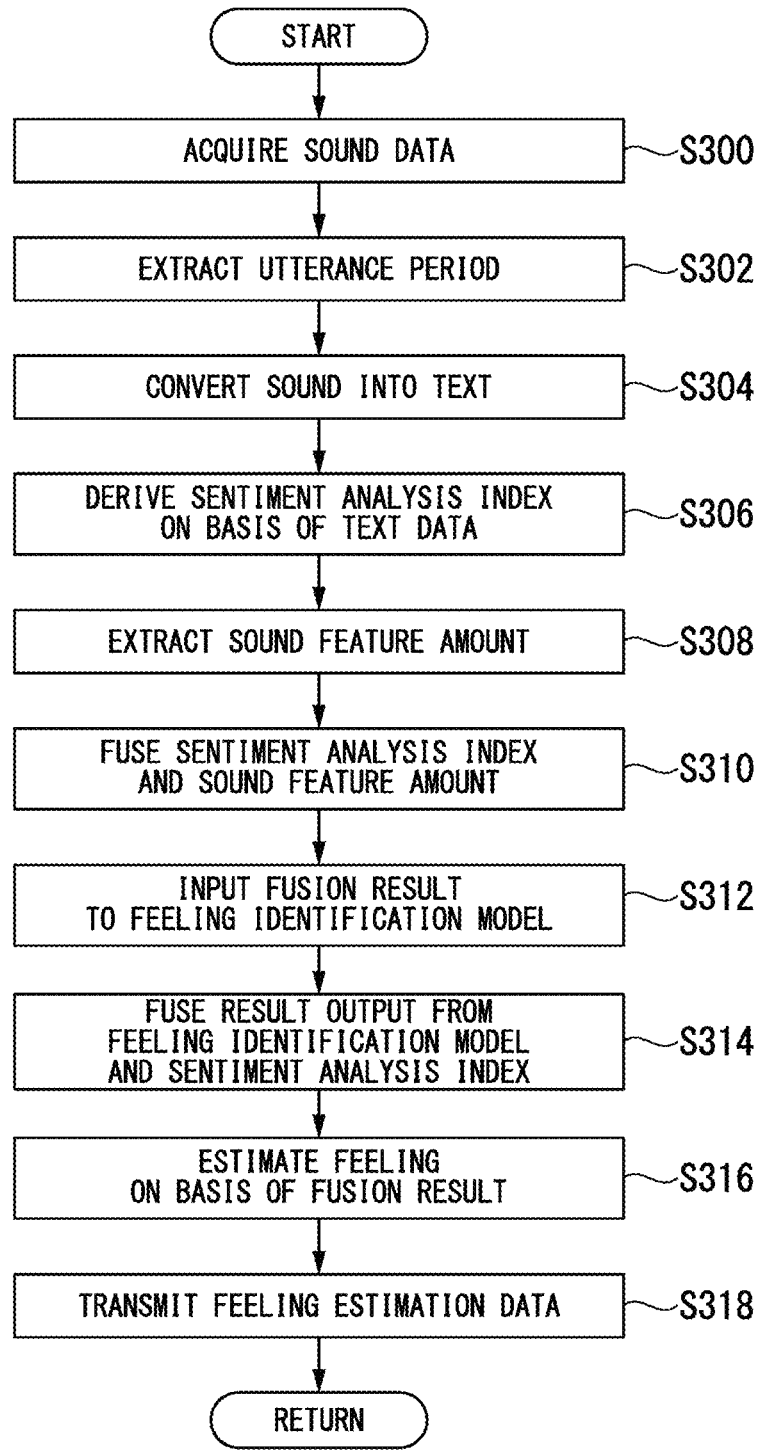
FIG. 12 is a flowchart illustrating a flow of a series of processing performed by the server device according to the first embodiment.

Hereinafter, processing performed by the server device 200 according to the first embodiment will be described with reference to a flowchart. FIG. 12 is a flowchart illustrating a flow of a series of processing performed by the server device 200 according to the first embodiment. The processing of the flowchart may be repeated at a predetermined cycle.

First, the first acquirer 232 acquires the sound data from the agent device 100 via the server-side communicator 202 (Step S300).

Next, the utterance period extractor 234 extracts an utterance period during which the occupant has made the utterance from the sound data acquired by the first acquirer 232 (Step S302).

Next, the sound recognizer 236 recognizes sound for each utterance period extracted by the utterance period extractor 234 and converts the recognized sound into text, thereby generating text data representing details of the utterance (Step S304).

Next, the sound recognizer 236 inputs the generated text data into the DNN that has experienced learning in advance to analyze a feeling of the occupant, thereby deriving the sentiment analysis index $IN_S$ (Step S306).

Next, the feature amount extractor 238 extracts the sound feature amount F from the sound in each utterance period extracted by the utterance period extractor 234 (Step S308).

Next, the first estimator 240 merges the sound feature amount F extracted by the feature amount extractor 238 and the sentiment analysis index $IN_S$ derived by the sound recognizer 236 into one result via early fusion (Step S310).

Next, the first estimator 240 inputs the result of the early fusion to the feeling identification model MDL, thereby tentatively estimating the feeling of the occupant (Step S312).

Next, the second estimator 242 merges the primary feeling identification value E as the estimation result of the first estimator 240 and the sentiment analysis index $IN_S$ derived by the sound recognizer 236 into one result via late fusion (Step S314).

Next, the second estimator 242 derives the secondary feeling identification value C on the basis of the result of the late fusion and estimates the feeling of the occupant (Step S316).

Next, the communication controller 244 transmits feeling estimation data including the secondary feeling identification value C as the estimation result of the second estimator 242 and the text data generated by the sound recognizer 236 to the agent device 100 via the server-side communicator 202 (Step S318). At this time, the text data may include pronunciation symbols (also called as phonetic alphabets or phonetic signs) corresponding to the respective characters in the character sequence representing details of the utterance one by one. In this manner, the agent device 100 changes a conversation assist form in accordance with which of +1.0, −1.0, and 0.0 the secondary feeling identification value C is. In this manner, the processing of the flowchart ends.

According to the aforementioned first embodiment, the server device 200 can maintain estimation results in a case in which results of feeling estimation based on sound data and feeling estimation based on text data are the same estimation results, such as "positive" and "positive" or "negative" and "negative" and can change an estimation result to a neutral estimation result in a case in which both the results of the feeling estimation are different from each other, such as "positive" and "negative" or "negative" and "positive" since a probability that an estimation error has occurred is high, for example, by including the first acquirer 232 configured to acquire sound data of an utterance of the occupant of the vehicle M in which the agent device 100 is mounted, a sound recognizer 236 configured to generate text data obtained by converting the sound data acquired by the first acquirer 232 into text, the first estimator 240 configured to merge the sound feature amount F based on the sound data and the sentiment analysis index $IN_S$ based on the text data into one result via early fusion and estimate the feeling of the occupant on the basis of the merging result via the early fusion, and the second estimator 242 configured to merge the primary feeling identification value E as the estimation result of the first estimator 240 and the sentiment analysis index $IN_S$ into one result via late fusion and estimate the feeling of the occupant on the basis of the merging result of the late fusion. As a result, it is possible to curb the plural of erroneous estimations, such as an estimation of a feeling of the occupant who is depressed as a "positive feeling" or an estimation of a feeling of the occupant who is excited as a "negative feeling", and thereby to improve precision of estimating the feeling of the occupant (an example of the user).

Modification Example of First Embodiment

Hereinafter, a modification example of the first embodiment will be described. Although the aforementioned first embodiment has been described above on the assumption that the agent device 100 mounted in each vehicle M and the server device 200 are mutually different devices, the invention is not limited thereto. For example, the server device 200 may be a virtual machine that is virtually realized by the agent-side controller 130 of the agent device 100. In this case, the agent device 100 is another example of the "feeling estimation device".

Figure 13:
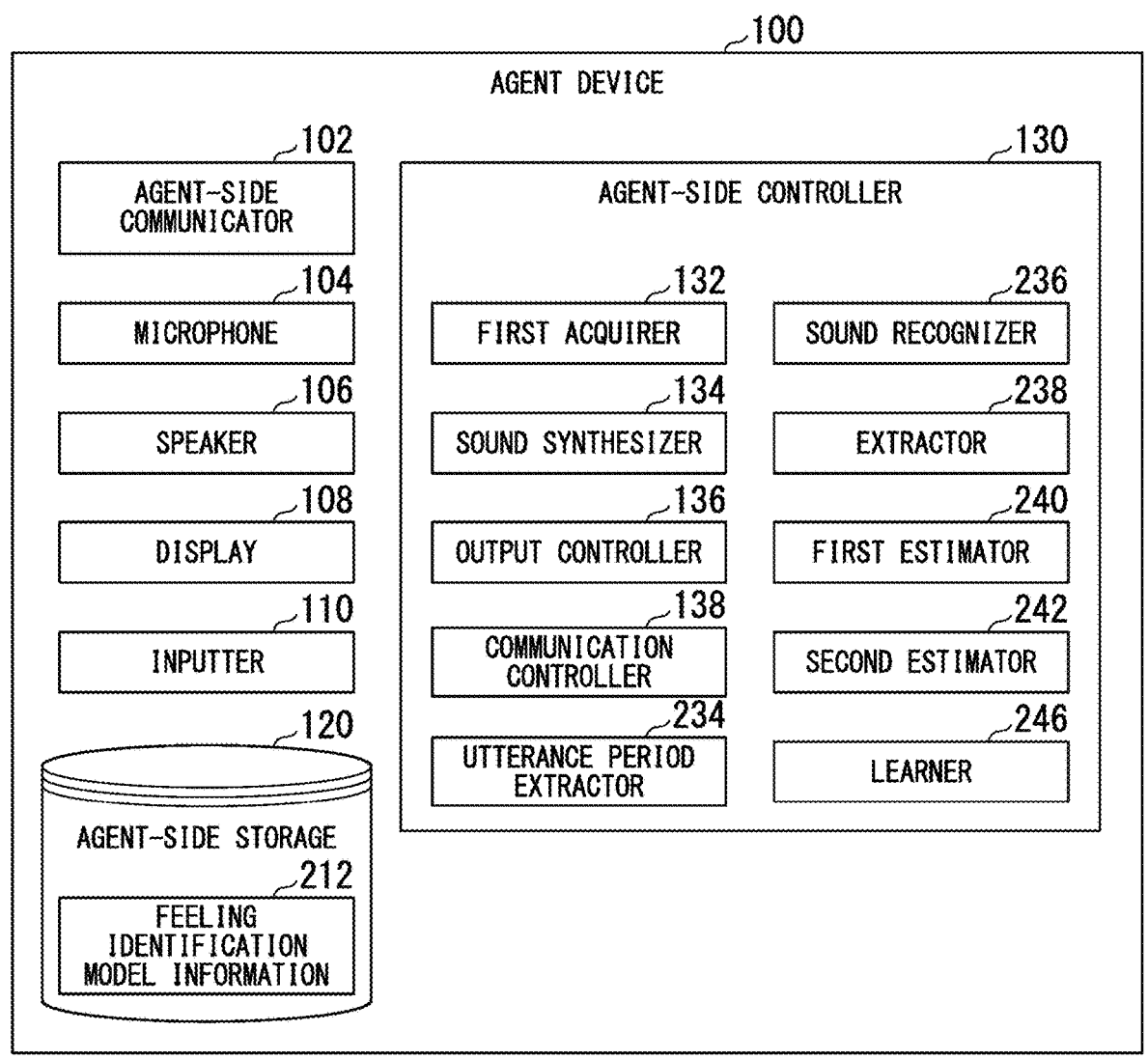
FIG. 13 is a diagram illustrating another example of the agent device according to the first embodiment.

FIG. 13 is a diagram illustrating another example of the agent device 100 according to the first embodiment. As illustrated in FIG. 13, the agent-side controller 130 of the agent device 100 may further include an utterance period extractor 234, a sound recognizer 236, a feature amount extractor 238, a first estimator 240, a second estimator 242, and a learner 246 in addition to the first acquirer 132, the sound synthesizer 134, the output controller 136, and the communication controller 138 described above. In this case, the speaker 106 and the display 108 of the agent device 100 are other examples of the "outputter" while the output controller 136 of the agent device 100 are another example of the "output controller that causes the outputter to output information based on the feeling of the user".

The agent-side storage 120 of the agent device 100 may store feeling identification model information 212.

With such a configuration, it is possible to estimate the feeling of the occupant from the sound of the utterance of the occupant using the agent device 100 alone and thereby to reduce a feeling estimation error and to improve precision of estimating the feeling of the occupant.

Although the aforementioned first embodiment has been described above on the assumption that the agent device 100 changes a sound pressure level, a cadence, and the like of agent sound, changes selection of a music to be replayed in the vehicle, and changes a movie and an image to be displayed in the vehicle on the basis of the feeling of the occupant estimated by the server device 200, the invention is not limited thereto. For example, the agent device 100 may change behaviors of the vehicle M, such as a speed, an acceleration, and a rotating angle, on the basis of the result of estimating the feeling of the occupant.

Although the aforementioned first embodiment has been described above on the assumption that the server device 200 includes the sound recognizer 236 and the sound recognizer 236 recognizes sound for each utterance period extracted by the utterance period extractor 234 and converts the recognized sound into text, thereby generating text data representing details of the utterance, the invention is not limited thereto. For example, the communication controller 244 of the server device 200 may transmit the sound data in the utterance period extracted by the utterance period extractor 234 to a specific external device via the server-side communicator 202 and may request the external device for generating text data from the sound data. The external device has a configuration similar to that of the sound recognizer 236 and generates text data from received sound data when the external device receives the sound data from another device. In addition, the external device transmits the generated text data to a device of an origin of the request. If the server-side communicator 202 receives the text data from the external device, then the sound recognizer 236 of the server device 200 derives the sentiment analysis index $IN_S$ from the text data received by the server-side communicator 202. In this case, the server-side communicator 202 or the sound recognizer 236 is another example of the "second acquirer".

Second Embodiment

Hereinafter, a second embodiment will be described. The aforementioned first embodiment has been described above on the assumption that the score S and the magnitude M of the sentiment analysis index $IN_S$ are added as new elements to the multidimensional vector representing the sound feature amount F such as ZCR, RMS, and F0 in early fusion.

Meanwhile, the second embodiment is different from the aforementioned first embodiment in that the score S and the magnitude M of the sentiment analysis index $IN_S$ are added as new elements to the multidimensional vector representing the sound feature amount F and also a feature amount indicating a tendency of driving operations of the occupant, a feature amount of an appearance of the occupant, a feature amount indicating a state of the vehicle M, and the like are added as new elements, in the early fusion. Hereinafter, the differences from the first embodiment will be mainly described, and description of points that are common to the first embodiment will be omitted. The second embodiment will be described by applying the same reference numerals to the same parts as those in the first embodiment.

Figure 14:
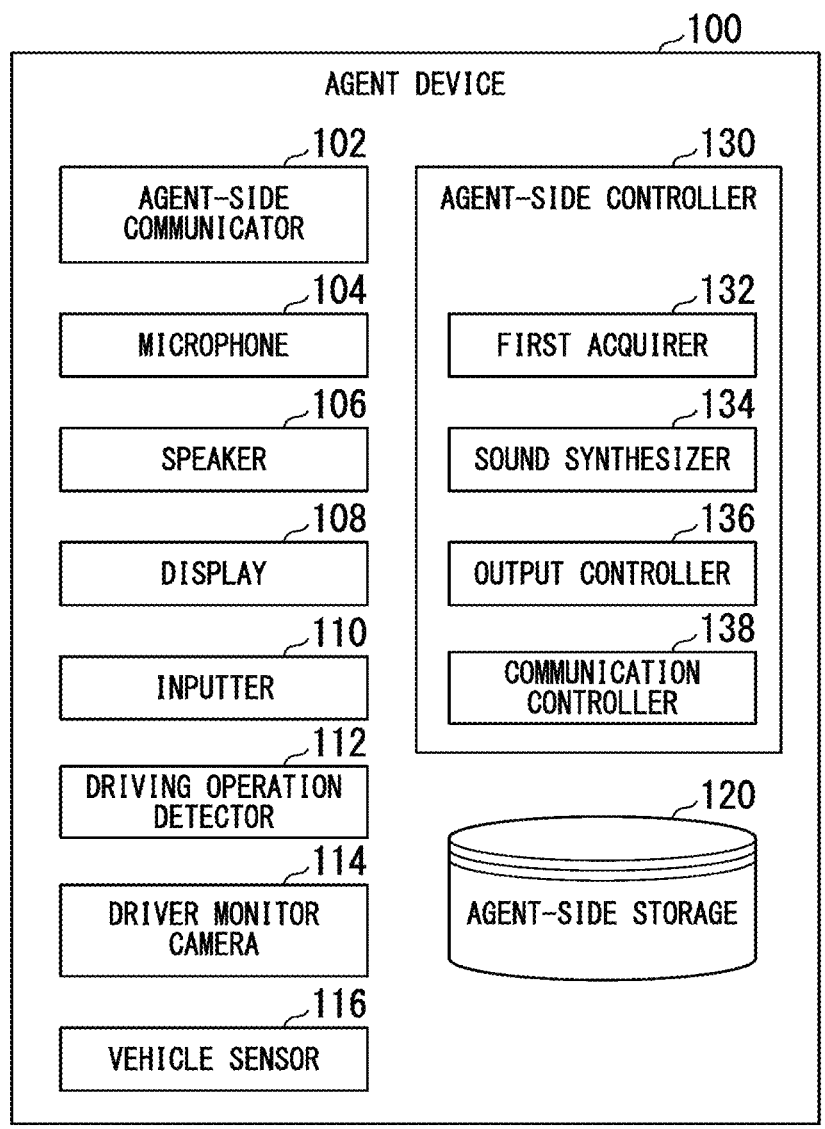
FIG. 14 is a diagram illustrating an example of a configuration of an agent device according to a second embodiment.

FIG. 14 is a diagram illustrating an example of a configuration of an agent device 100 according to the second embodiment. The agent device 100 according to the second embodiment further includes a driving operation detector 112, a driver monitor camera 114, and a vehicle sensor 116 in addition to the aforementioned configurations.

The driving operation detector 112 detects an operation amount indicating how much driving operators such as a steering wheel, an acceleration pedal, and a pedal have been operated by the occupant and detects whether or not any operations have been made on the driving operators. That is, the driving operation detector 112 detects the driving operations of the occupant performed on the driving operators. For example, the driving operation detector 112 outputs the amount of detected operations or information indicating whether or not any operations have been detected (hereinafter referred to as user driving operation data) to the agent-side controller 130.

The driver monitor camera 114 is mounted in the interior of the vehicle M in which the agent device 100 is mounted to image a face of each occupant seated in a seat in the vehicle, for example. The driver monitor camera 114 is a digital camera using a solid imaging element such as a charge coupled device (CCD) or a complementary metal oxide semiconductor (CMOS), for example. The driver monitor camera 114 repeatedly images each occupant at predetermined timings, for example. The driver monitor camera 114 generates data of the image obtained by imaging the occupant (hereinafter referred to as image data) and outputs the generated image data to the agent-side controller 130.

The vehicle sensor 116 includes an azimuth sensor for detecting orientation of the vehicle M, a vehicle speed sensor for detecting a speed of the vehicle M, an acceleration sensor for detecting acceleration of the vehicle M, a yaw rate sensor for detecting an angular speed around a vertical axis of the vehicle M, a torque sensor for detecting a steering torque, and the like. The vehicle sensor 116 outputs data including the azimuth orientation, the speed, the acceleration, and the like detected (hereinafter referred to as vehicle state data) to the agent-side controller 130.

The communication controller 138 according to the second embodiment transmits sound data, user driving operation data, image data, and vehicle state data to the server device 200 via the agent-side communicator 102.

If the server-side communicator 202 receives the image data, then the feature amount extractor 238 of the server device 200 according to the second embodiment extracts, from the image data, feature points of face parts such as eyes, mouth, and nose as feature amounts of the face of the occupant.

The first estimator 240 of the server device 200 according to the second embodiment merges (I) below with (III) into one result via early fusion and inputs the merging result in the early fusion to the feeling identification model MDL, thereby tentatively estimating a feeling of the occupant.

(I): A sound feature amount F extracted by the feature amount extractor 238;

(II): A sentiment analysis index $IN_S$ derived by the sound recognizer 236; and (III): Some or all of the amount of operation performed on the driving operators that the user driving operation data indicates, the feature amount of the face of the occupant extracted from the image data, and the state amount of the vehicle M that the vehicle state data indicates.

Figure 15:
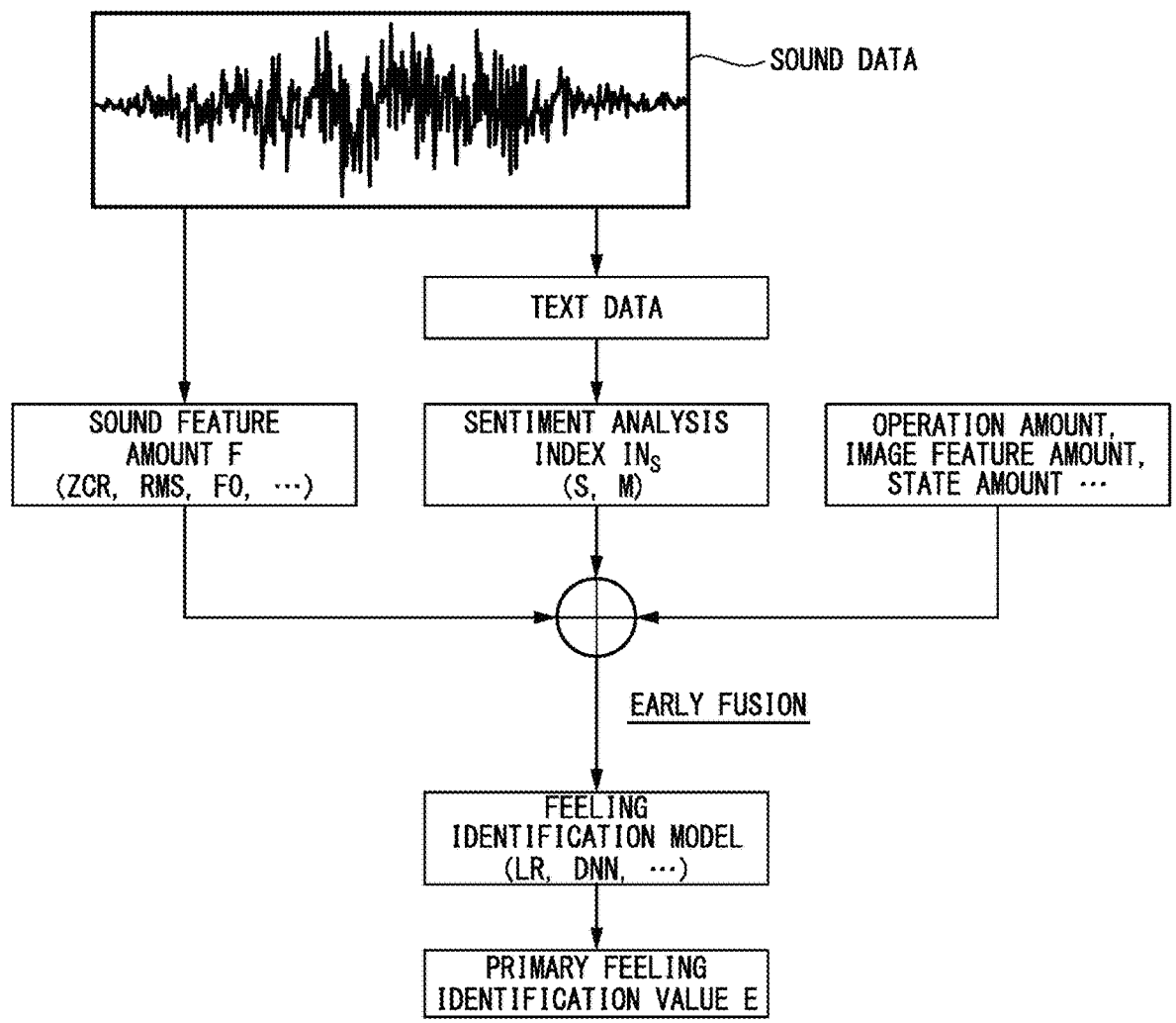
FIG. 15 is a diagram for explaining early fusion according to the second embodiment.

FIG. 15 is a diagram for explaining early fusion according to the second embodiment. For example, the first estimator 240 adds, as new elements, the score S and the magnitude M of the sentiment analysis index $IN_S$, the operation amount of the steering wheel (for example, a steering torque and a steering angle), the operation amounts of the accelerator pedal and the brake pedal (for example, the amount of stepping), the feature amounts of the face of the occupant, and the state amounts such as a speed, an acceleration, and an angular speed of the vehicle M to the multidimensional vector representing the sound feature amount F including ZCR, RMS, and F0, in early fusion.

Then, the first estimator 240 inputs the multidimensional vector with an increased number of dimensions to the feeling identification model MDL realized by logistic regression, DNN, or the like. In this manner, it is possible to derive a primary feeling identification value E that is closer to a current feeling of the occupant.

The learner 246 according to the second embodiment learns the feeling identification model MDL using teacher data in which a primary feeling identification value E as a correct answer is associated as a teacher label with a combination of the sound feature amount F extracted from the sound data for learning, the sentiment analysis index $IN_S$ of the text data generated from the same sound data for learning, the operation amount of the driving operators, the feature amounts of the face of the occupant, and the state amount of the vehicle M.

According to the aforementioned second embodiment, since (I) the sound feature amount F, (II) the sentiment analysis index $IN_S$, and (III) some or all of the operation amount of the driving operators, the feature amounts of the face of the occupant, and the state amount of the vehicle M are merged into one result via the early fusion, and the primary feeling identification value E is derived on the basis of the merging result in the early fusion, it is possible to further reduce a feeling estimation error as compared with the first embodiment. As a result, it is possible to further improve precision of estimating a feeling of the user.

Third Embodiment

Hereinafter, a third embodiment will be described. The aforementioned first embodiment and the second embodiment have been described above on the assumption that the agent device 100 is mounted in a vehicle. Meanwhile, the third embodiment is different from the aforementioned first or second embodiment in that a terminal device such as a smartphone or a mobile phone includes the functions of the agent device 100. Hereinafter, the differences from the first or second embodiment will be mainly described, and description of points that are common to the first or second embodiment will be omitted. The third embodiment will be described by providing the same reference numerals to the same parts as those in the first or second embodiment.

Figure 16:
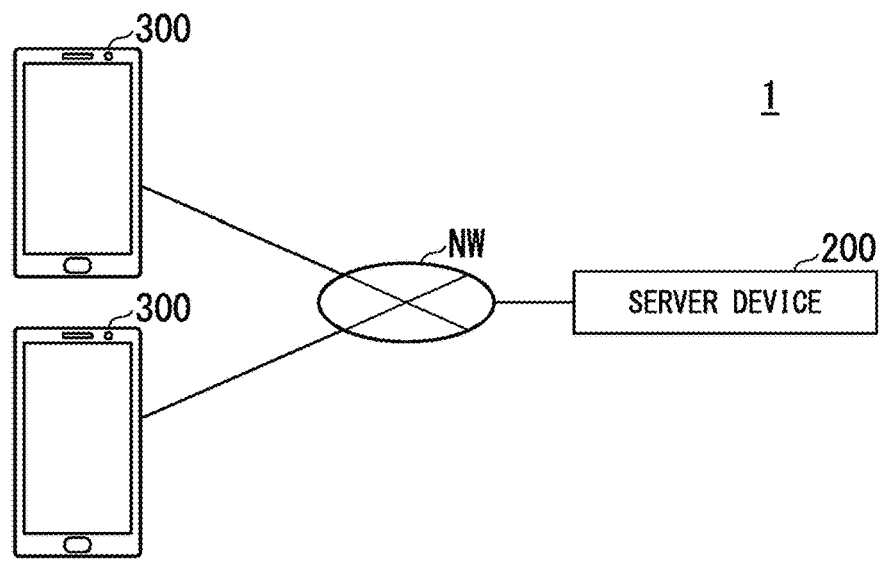
FIG. 16 is a diagram illustrating an example of a configuration of an agent system according to a third embodiment.

FIG. 16 is a diagram illustrating an example of a configuration of an agent system 1 according to the third embodiment. The agent system 1 according to the third embodiment includes, for example, a plurality of terminal devices 300 and a server device 200.

The terminal devices 300 are devices that users can use and are terminal devices provided with input devices, display devices, communication devices, storage devices, and arithmetic devices, such as mobile phones including smartphones, tablet terminals, and various personal computers, for example. The communication devices include network cards such as NICs, wireless communication modules, and the like. User agents (UAs) such as web browsers and application programs are activated in the terminal devices 300 to receive various input operations from the users.

Configuration of Terminal Device

Figure 17:
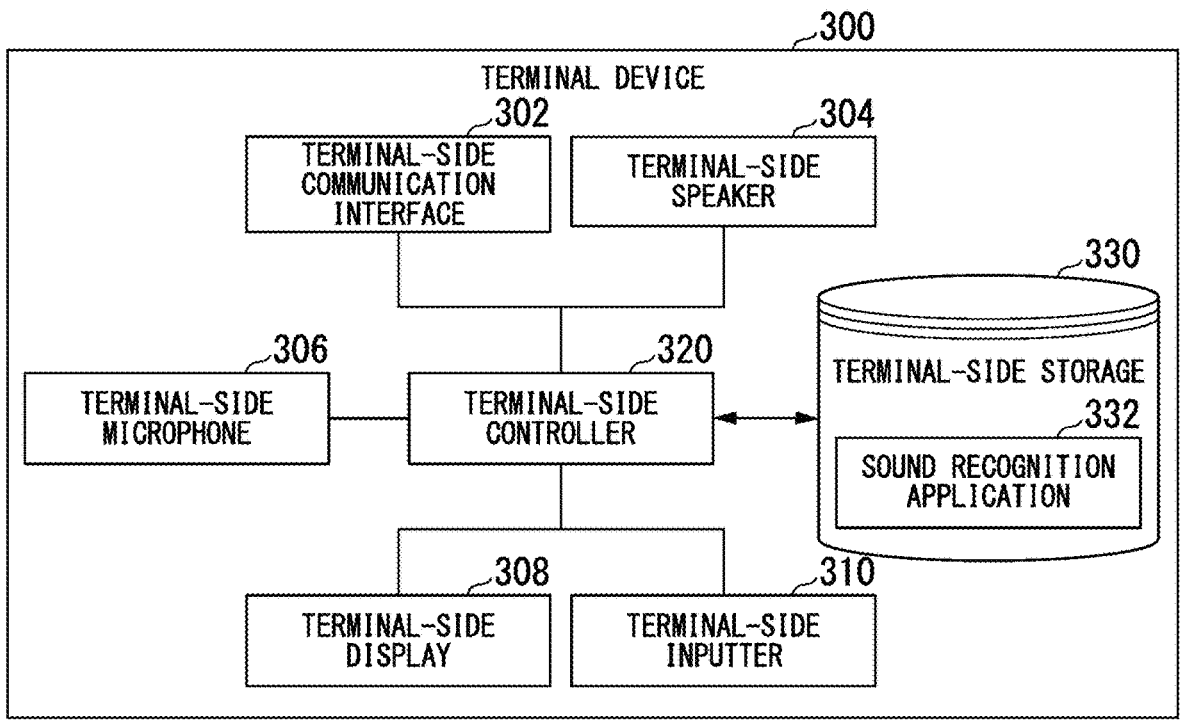
FIG. 17 is a diagram illustrating an example of a configuration of a terminal device.

FIG. 17 is a diagram illustrating an example of a configuration of a terminal device 300. As illustrated in the drawing, the terminal device 300 includes, for example, a terminal-side communication interface 302, a terminal-side speaker 304, a terminal-side microphone 306, a terminal-side display 308, a terminal-side inputter 310, a terminal-side controller 320, and a terminal-side storage 330.

The terminal-side communication interface 302 includes hardware for establishing connection to the network NW. For example, the terminal-side communication interface 302 may include an antenna and a transceiver device, an NIC, or the like. For example, the terminal-side communication interface 302 communicates with the server device 200 via the network NW and receives feeling estimation data from the server device 200.

The terminal-side speaker 304 outputs sound on the basis of information output from the terminal-side controller 320.

The terminal-side microphone 306 is a sound input device that collects sound in the surroundings. The terminal-side microphone 306 outputs the collected sound data to the terminal-side controller 320.

The terminal-side display 308 includes, for example, a display device such as an LCD or an organic EL display. The terminal-side display 308 displays an image on the basis of information output from the terminal-side controller 320.

The terminal-side inputter 310 includes, for example, a user interface such as a button, a keyboard, and a mouse. The terminal-side inputter 310 receives an operation from the occupant and outputs a signal in accordance with the received operation to the terminal-side controller 320. The terminal-side inputter 310 and the terminal-side display 308 may be an integrated touch panel.

The terminal-side controller 320 is realized by a processor such as a CPU executing a program or an application stored in the terminal-side storage 330, for example. The terminal-side controller 320 may be realized by hardware such as an LSI, an ASIC, or an FPGA. The program or the application may be stored in advance in the terminal-side storage 330 or may be stored in a detachable storage medium such as a DVD or a CD-ROM and may be installed in the terminal-side storage 330 by the storage medium being attached to a drive device.

The terminal-side storage 330 is realized, for example, by an HDD, a flash memory, an EEPROM, a ROM, a RAM, or the like. The terminal-side storage 330 stores the program and the application that the processor that realizes the terminal-side controller 320 refers to, for example. The application includes, for example, an application for analyzing or examining the sound of an utterance of the user and estimating a feeling of the user (hereinafter referred to as a sound recognition application 332).

Figure 18:
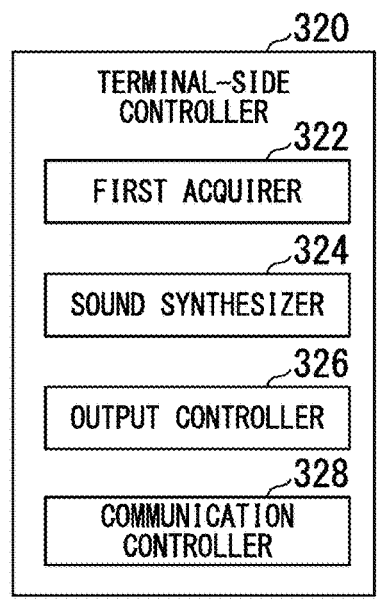
FIG. 18 is a diagram illustrating an example of a functional configuration of a terminal-side controller.

Hereinafter, functions of the terminal-side controller 320 when the processor that realizes the terminal-side controller 320 executes the sound recognition application 332 will be described. FIG. 18 is a diagram illustrating an example of a functional configuration of the terminal-side controller 320. For example, the terminal-side controller 320 includes a first acquirer 322, a sound synthesizer 324, an output controller 326, and a communication controller 328.

The first acquirer 322 acquires the sound data from the terminal-side microphone 306.

The sound synthesizer 324 generates agent sound on the basis of the feeling estimation data received by the terminal-side communication interface 302 from the server device 200. For example, the sound synthesizer 324 generates the agent sound on the basis of the result of estimating the feeling of the user and the text data included in the feeling estimation data.

If the sound synthesizer 324 generates the agent sound, then the output controller 326 causes the terminal-side speaker 304 to output the agent sound. At this time, the output controller 326 may causes the terminal-side display 308 to display an image in accordance with a feeling estimation result.

The communication controller 328 transmits the sound data acquired by the first acquirer 322 to the server device 200 via the terminal-side communication interface 302. In this manner, the server device 200 estimates the feeling of the user who uses the terminal device 300 on the basis of the sound data received from the terminal device 300.

According to the aforementioned third embodiment, since the terminal device 300 such as a smartphone includes functions of the agent device 100, it is possible to improve precision of estimating not only a feeling of an occupant who is in a moving object but also a feeling of the user who uses the terminal device 300.

Although the modes for carrying out the invention have been described above with reference to embodiments, the invention is not limited to such embodiments at all, and various modifications and replacements can be made without departing from the gist of the invention.

What is claimed is:

1. A feeling estimation device comprising:
a first acquirer configured to acquire sound data of an utterance of a user;
a second acquirer configured to acquire text data obtained by converting the sound data acquired by the first acquirer into text;
a first estimator configured to merge an index value based on the sound data acquired by the first acquirer and an index value based on the text data acquired by the second acquirer via first fusion and estimate a feeling of the user on the basis of the merged index value; and
a second estimator configured to merge an index value indicating a result of the estimation performed by the first estimator and the index value based on the text data acquired by the second acquirer via second fusion and estimate a feeling of the user on the basis of the merged index value.

2. The feeling estimation device according to claim 1, further comprising:
an outputter configured to output information; and
an output controller configured to cause the outputter to output information based on the feeling of the user estimated by the second estimator.

3. The feeling estimation device according to claim 1, wherein the second estimator estimates whether the feeling of the user is a first positive feeling, a second negative feeling, or a third neutral feeling that is neither the first feeling nor the second feeling on the basis of a result of the second fusion.

4. The feeling estimation device according to claim 3, wherein the second estimator
estimates that the feeling of the user is the first feeling in a case in which a sum of the index value indicating the result of the estimation performed by the first estimator and the index value based on the text data acquired by the second acquirer is equal to or greater than a first threshold value,
estimates that the feeling of the user is the second feeling in a case in which the sum of the index value indicating the result of the estimation performed by the first estimator and the index value based on the text data acquired by the second acquirer is equal to or less than a second threshold value that is smaller than the first threshold value, and
estimates that the feeling of the user is the third feeling in a case in which the sum of the index value indicating the result of the estimation performed by the first estimator and the index value based on the text data acquired by the second acquirer is less than the first threshold value and greater than the second threshold value.

5. The feeling estimation device according to claim 1, further comprising:
an extractor configured to extract one or more feature amounts from the sound data acquired by the first acquirer,
wherein the second acquirer derives a first index value that expresses, as a numerical value, an overall feeling of the text indicated by the text data and a second index value that indicates an amount of feeling content included in the text, and
the first estimator merges the first index value and the second index value derived by the second acquirer and the one or more feature amounts extracted by the extractor via the first fusion.

6. The feeling estimation device according to claim 5, wherein the first estimator adds the first index value and the second index value derived by the second acquirer as elements to multidimensional data that includes each of the one or more feature amounts extracted by the extractor in the first fusion.

7. The feeling estimation device according to claim 1,
wherein the first acquirer further acquires driving operation data indicating a driving operation of a vehicle that the user is in and captured image data of the user, and
the first estimator merges the index value based on the sound data acquired by the first acquirer, the index value based on the text data acquired by the second acquirer, an index value based on the driving operation data acquired by the first acquirer, and an index value based on the image data acquired by the first acquirer via the first fusion and estimates a feeling of the user on the basis of the merged index value.

8. A feeling estimation method comprising, by a computer:
acquiring sound data of an utterance of a user;
acquiring text data that is obtained by converting the acquired sound data into text;
merging an index value based on the sound data and an index value based on the text data via first fusion and estimating a feeling of the user on the basis of the merged index value; and
merging an index value indicating a result of the estimation of the feeling of the user based on the index value merged via the first fusion and the index value based on the text data via second fusion and estimating a feeling of the user on the basis of the merged index value.

9. A computer-readable non-transitory storage medium that stores a program for causing a computer to execute:
acquiring sound data of an utterance of a user;
acquiring text data that is obtained by converting the acquired sound data into text;
merging an index value based on the sound data and an index value based on the text data via first fusion and estimating a feeling of the user on the basis of the merged index value; and
merging an index value indicating a result of the estimation of the feeling of the user based on the index value merged via the first fusion and the index value based on the text data via second fusion and estimating a feeling of the user on the basis of the merged index value.

* * * * *